United States Patent
Yun

(10) Patent No.: US 11,603,085 B2
(45) Date of Patent: Mar. 14, 2023

(54) ELECTRIC BOOSTER FOR VEHICLE

(71) Applicant: HYUNDAI MOBIS CO., LTD., Seoul (KR)

(72) Inventor: Seung Hyun Yun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 428 days.

(21) Appl. No.: 16/850,959

(22) Filed: Apr. 16, 2020

(65) Prior Publication Data
US 2020/0331446 A1    Oct. 22, 2020

(30) Foreign Application Priority Data

Apr. 18, 2019  (KR) .................. 10-2019-0045334

(51) Int. Cl.
*B60T 13/74* (2006.01)
*B60T 8/32* (2006.01)
*F16H 25/24* (2006.01)

(52) U.S. Cl.
CPC .......... *B60T 13/745* (2013.01); *B60T 8/3265* (2013.01); *F16H 25/24* (2013.01)

(58) Field of Classification Search
CPC ....... B60T 13/745; B60T 8/3265; F16H 25/24
See application file for complete search history.

(56) References Cited

U.S. PATENT DOCUMENTS

2017/0029017 A1*  2/2017  Pattok .................. B62D 5/0448

FOREIGN PATENT DOCUMENTS

| CN | 105882638 A | 8/2016 | |
|---|---|---|---|
| CN | 109572655 A | 4/2019 | |
| DE | 102010051744 A1 * | 5/2012 | ............ B60T 13/662 |
| DE | 102018216585 A1 * | 4/2019 | ............ B60T 11/102 |
| DE | 102018216590 A1 * | 4/2019 | ............ B60T 11/102 |
| KR | 10-2014-0099270 A | 8/2014 | |

OTHER PUBLICATIONS

Office Action dated Jan. 24, 2022 in the corresponding Chinese Patent Application No. 202010290561.5.

* cited by examiner

*Primary Examiner* — Melanie Torres Williams
(74) *Attorney, Agent, or Firm* — NovoTechIP International PLLC

(57) ABSTRACT

An electric booster for a vehicle includes a housing having a cylinder structure capable of supporting a hydraulic pressure formed therein; a screw bolt installed in the housing; a screw nut screwed to the screw bolt; a gear unit configured to transfer a rotational force of a motor to the screw nut; a rotation preventing unit coupled with the screw bolt, and configured to prevent rotation of the screw bolt by being brought into contact with the housing; and a piston moved by being pressed by the screw bolt, and configured to form a hydraulic pressure in the housing.

17 Claims, 7 Drawing Sheets

SECTION A-A'

SECTION A-A'

SECTION B-B'

SECTION C-C'

ELECTRIC BOOSTER FOR VEHICLE

CROSS-REFERENCE TO RELATED APPLICATION

This application claims priority from and the benefit of Korean Patent Application No. 10-2019-0045334, filed on Apr. 18, 2019, which is hereby incorporated by reference for all purposes as if set forth herein.

BACKGROUND

Field

Exemplary embodiments of the present disclosure relate to an electric booster for a vehicle, and more particularly, to an electric booster for a vehicle for increasing brake performance using electric power.

Discussion of the Background

In general, a brake device of a vehicle generates a frictional force by pushing a brake pad to decelerate a running vehicle or maintain a parked state. In this regard, since a driver's power is limited, brake performance is increased through boosting a force by a booster. While a booster using vacuum is employed in the related art, an electric booster using a motor is recently employed. The electric booster requires a structure capable of supporting forces acting in an axial direction and a radial direction when a brake is operated, and a rotation preventing structure capable of preventing the rotation of a screw when a torque of the motor is transferred to the screw through gears to convert the rotation of the motor into the linear movement of the screw.

In the related art, in order to realize the structure for supporting forces in an axial direction and a radial direction and the structure for preventing the rotation of the screw, a structure in which a plurality of guide pins are disposed in parallel around the screw is employed. Such guide pins mainly support a load generated by a hydraulic pressure in the electric booster, and guide a guide rod which is connected with the screw, along a straight path.

However, in order to guide the guide rod along the guide pins, hollow spaces for securing a movement range of the guide rod are needed around the guide pins. Therefore, the size of the electric booster increases, which is disadvantageous in terms of layout in disposing other parts of the vehicle. Further, the hollow spaces defined around the guide pins serve as ringing spaces of the noise generated by the operation of the gears, which is disadvantageous in terms of noise.

Therefore, it is demanded in the art to cope with these problems.

A background art of the present disclosure is disclosed in Korean Patent Laid-open Publication No. 2014-0099270 (published on Aug. 11, 2014 and entitled 'Electric Brake Booster').

SUMMARY

Various embodiments are directed to an electric booster for a vehicle capable of realizing miniaturization and noise reduction.

In an embodiment, an electric booster for a vehicle may include: a housing having a cylinder structure capable of supporting a hydraulic pressure formed therein; a screw bolt installed in the housing; a screw nut screwed to the screw bolt; a gear unit configured to transfer a rotational force of a motor to the screw nut; a rotation preventing unit coupled with the screw bolt, and configured to prevent rotation of the screw bolt by being brought into contact with the housing; and a piston moved by being pressed by the screw bolt, and configured to form a hydraulic pressure in the housing.

The rotation preventing unit may include: a rotation preventing disk part coupled to the screw bolt; and one or more disk guide parts coupled to the housing, and configured to guide movement of the rotation preventing disk part along a straight path.

The rotation preventing disk part may include: a disk portion disposed around the screw bolt; one or more guide engagement portions formed to project, on a circumferential outer surface of the disk portion, and inserted into the disk guide part; and a bolt coupling portion connected with the disk portion, and coupled to the screw bolt.

The bolt coupling portion may include: an extending portion connected with the disk portion; an assembly projection portion formed at an end of the extending portion, and brought into contact with an end of the screw bolt; one or more assembly hole portions formed on the extending portion to pass through the extending portion; and one or more locking members locked to the screw bolt by passing through the assembly hole portion.

The assembly hole portion may include: an engagement receiving portion formed to be recessed, on an outer surface of the extending portion, a head portion of the locking member being received in the engagement receiving portion; and a through-hole portion formed to communicate with the engagement receiving portion, a body portion of the locking member passing through the through-hole portion.

The rotation preventing disk part may further include: a spring assembly portion formed on the disk portion to project toward the piston, and configured to prevent fluctuation of a spring which is disposed around the piston.

The spring assembly portion may include: a spring assembly projection portion formed to project, on the disk portion, extending concentrically with the screw bolt, and an end of the spring being assembled; and an opening formed to be open, on the spring assembly projection portion, to allow the locking member of the bolt coupling portion to pass therethrough.

The disk guide part may include: a guide installation portion formed to be recessed, on an inner surface of the housing, and extending along a movement path of the screw bolt; and a guide rail portion coupled to the guide installation portion, and configured to guide the rotation preventing disk part along the straight path.

The guide rail portion may include: a rail body portion brought into contact with an inner surface of the guide installation portion; and a guide groove formed to be recessed, on the rail body portion, configured to receive the rotation preventing disk part, and extending along the movement path of the screw bolt.

The rail body portion may include: a first rail body portion brought into contact with the inner surface of the guide installation portion in a radial direction; and a second rail body portion formed at an end of the first rail body portion, and brought into contact with the inner surface of the guide installation portion in a moving direction of the screw bolt.

The housing may include: a first housing unit having the piston and a part of the gear unit disposed therein; and a second housing unit connected with the first housing unit, and having the screw nut and the other part of the gear unit disposed therein.

The first housing unit may include: a cylinder part formed with a piston receiving part in which the piston is received, and having a hydraulic pressure formed therein by movement of the piston; a motor connecting part formed integrally with the cylinder part, and formed with a motor receiving part in which an output shaft of the motor is received; and a first gear box part formed between the cylinder part and the motor connecting part to communicate with the cylinder part and the motor connecting part, and formed with a first gear receiving part in which a first gear of the gear unit connected with the output shaft and a portion of a second gear meshed with the first gear are received.

The first housing unit may further include: a first partitioning wall part configured to partition the cylinder part and the motor connecting part, and having one side which faces the piston receiving part and the other side which faces the motor receiving part.

The first housing unit may further include: a second partitioning wall part configured to partition the motor connecting part and the first gear box part, and having one side which faces the motor receiving part and the other side which faces the first gear receiving part.

The second partitioning wall part may include: a partitioning wall body portion configured to partition the motor connecting part and the first gear box part; a bearing installation portion formed on the partitioning wall body portion to pass through the partitioning wall body portion, and having installed therein a bearing which rotatably supports the output shaft; and a first gear shaft support portion formed to be recessed, on the partitioning wall body portion, and configured to rotatably support the second gear.

The second housing unit may include: a second gear box part formed with a second gear receiving part in which the other portion of the second gear is received, and configured to communicate with the first gear receiving part; and a boosting body part formed integrally with the second gear box part, and configured to receive a third gear of the gear unit, which is coupled with the screw nut.

The second gear box part may include: a box body portion; a second gear shaft support portion formed to be recessed, on the box body portion, and configured to rotatably support the first gear; and a third gear shaft support portion formed to be recessed, on the box body portion, and configured to rotatably support the second gear.

The gear unit may include: the first gear coupled to an output shaft of the motor; the second gear meshed with the first gear, and configured to primarily decelerate rotation of the first gear; and the third gear coupled with the screw nut, meshed with the second gear, and configured to secondarily decelerate rotation of the second gear.

The second gear may include: a second input gear meshed with the first gear; and a second output gear having a smaller diameter than the second input gear, coaxially connected with the second input gear, and meshed with the third gear.

In the electric booster for a vehicle according to the embodiments of the present disclosure, a housing is fabricated to have a stiffness, that is, a thickness and a material, capable of directly supporting loads generated in an axial direction and a radial direction due to a hydraulic pressure and other loads generated in an axial direction and a circumferential direction, including an elastic force of a spring and a rotational force acting on a rotation preventing unit, and the rotation of a screw bolt is prevented using the rotation preventing unit. As a consequence, the application of guide pins which couple a plurality of housings with one another and at the same time guide the movement of a screw bolt along a straight path in the related art may be omitted.

Therefore, in the present disclosure, when compared to the related art in which hollow spaces should be formed around the guide pins in a number corresponding to the number of the guide pins to guide the reciprocating movement of the screw bolt using the guide pins, the guide pins and coupling means thereof may be omitted, and a size may be reduced by a size corresponding to the guide pins and the hollow spaces formed around the guide pins. As a consequence, the miniaturization and a light weight of the electric booster may be realized, advantages may be provided in terms of layout in disposing other parts of a vehicle, and a problem caused by ringing of gear noise due to the presence of the hollow spaces may be solved.

Also, in the present disclosure, the housing has a compact structure including only a first housing unit and a second housing unit. That is to say, the number of divisions is minimized to two, that is, the number of division parts and coupling parts which may degrade stiffness, is minimized. As a consequence, it is possible to more stably support the loads acting in an axial direction and a radial direction as described above.

Further, in the present disclosure, the first housing unit has a structure in which a motor housing and a boosting body according to the related art are integrated, that is, has a structure in which a cylinder part, a motor connecting part, a first gear box part, a first partitioning wall part and a second partitioning wall part are integrally formed. As a consequence, a cantilever structure of an output shaft may be improved, four locking means having a structure of O-rings and male screws, which is applied in the related art, may be omitted, and a precision machining process for forming four locking holes, four tabs and O-ring seats may be eliminated, thereby realizing a reduction in a manufacturing cost due to a reduction in the number of parts and further improving the productivity.

In the present disclosure, the first housing unit has the structure in which the cylinder part, the motor connecting part, the first gear box part, the first partitioning wall part and the second partitioning wall part are integrally formed. As a consequence, it is possible not only to prevent precision and productivity from deteriorating due to machining tolerances, assembly tolerances and allowances of the motor housing and the boosting body, but also to form, in one body, two shaft support elements which support rotation shafts of a first gear and a second gear. In other words, since a bearing installation portion and a first gear shaft support portion may be formed on the second partitioning wall part, position allowances of the first gear and the second gear may be significantly reduced, and noise due to the vibration of gear meshing portions may be reduced.

Moreover, in the present disclosure, the cylinder part and the motor connecting part share the first partitioning wall part and the motor connecting part and the first gear box part share the second partitioning wall part. As a consequence, when compared to the related art in which connection surface portions are defined in the motor housing and the boosting body, respectively, and the motor housing and the boosting body are coupled with each other with the connection surface portions disposed to overlap with each other, a size and a weight of the housing may be significantly reduced. Accordingly, since a size of the housing is further reduced, the layout is easy and is applicable to various kinds of vehicles.

In the present disclosure, the cylinder part and the motor connecting part share the first partitioning wall part. As a consequence, when compared to the related art, a distance between the first gear and a third gear may be shortened by a thickness of the motor housing and a clearance between the motor housing and the boosting body that are reduced or eliminated, and accordingly, a design range of gears may be further extended.

DETAILED DESCRIPTION OF THE ILLUSTRATED EMBODIMENTS

Hereinafter, an electric booster for a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
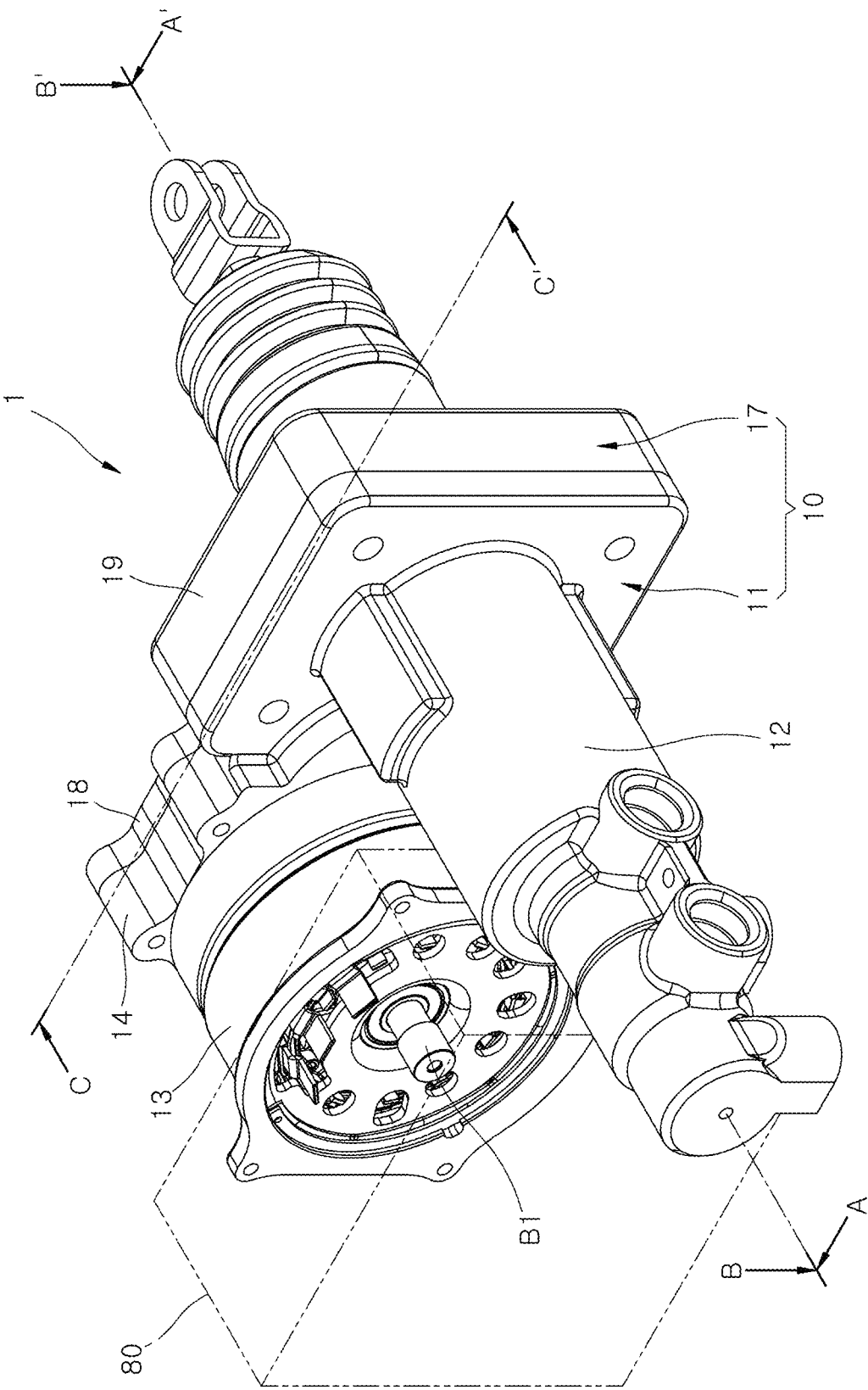
FIG. 1 is a perspective view schematically illustrating a representation of an example of an electric booster for a vehicle in accordance with an embodiment of the present disclosure.
Figure 2:
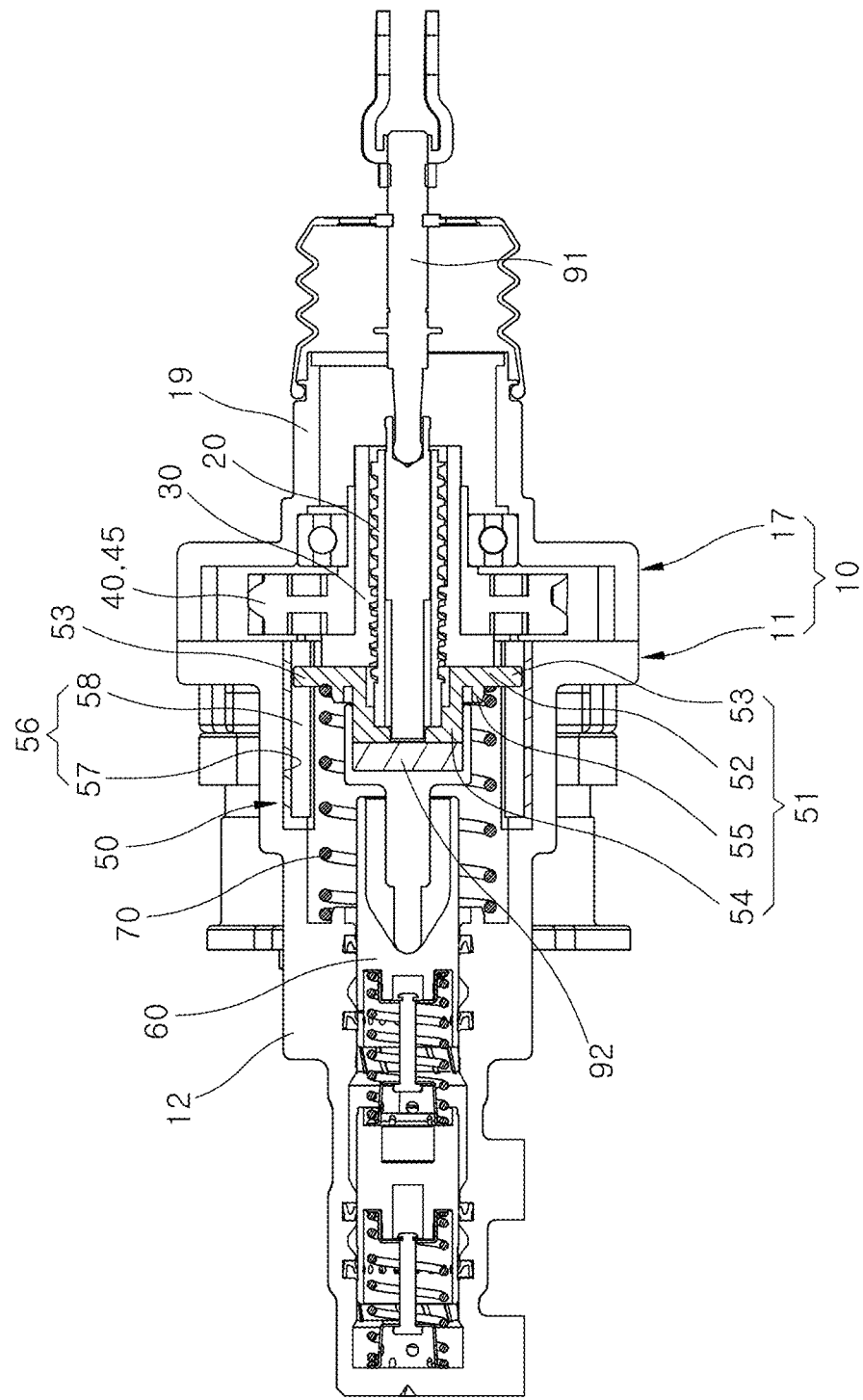
FIG. 2 is a cross-sectional view taken along the line A-A' of FIG. 1.

FIG. 1 is a perspective view schematically illustrating a representation of an example of an electric booster for a vehicle in accordance with an embodiment of the present disclosure, and FIG. 2 is a cross-sectional view taken along the line A-A' of FIG. 1.

Referring to FIGS. 1 and 2, the electric booster for a vehicle 1 in accordance with the embodiment of the present disclosure includes a housing 10, a screw bolt 20, a screw nut 30, a gear unit 40, a rotation preventing unit 50, and a piston 60.

The housing 10 forms a space in which the screw bolt 20, the screw nut 30, the gear unit 40, the rotation preventing unit 50 and the piston 60 may be received, and at the same time, has a rigid structure capable of supporting a hydraulic pressure formed therein by the piston 60, an elastic force of a spring 70, a rotational force acting on the screw bolt 20, and so forth.

The screw bolt 20 is installed inside the housing 10, and the screw nut 30 is screwed to the outer surface of the screw bolt 20. The gear unit 40 transfers a rotational force of a motor 80 to the screw nut 30. The rotation preventing unit 50 is coupled with the screw bolt 20, and is brought into contact with the housing 10 to prevent the rotation of the screw bolt 20.

When the motor 80 is driven, the rotational force of the motor 80 is increased while passing through the gear unit 40, and is transferred to the screw nut 30. As the screw nut 30 is rotated in place, the screw bolt 20 is linearly moved toward one end or the other end of the housing 10 when viewed from the screw nut 30. By this function, the rotational motion of the motor 80 is converted into the linear motion of the screw bolt 20. The piston 60 is pressed by the screw bolt 20 to be moved toward the one end or the other end of the housing 10, and forms a hydraulic pressure inside the housing 10.

The present disclosure relates to an electric booster for a vehicle 1, and is based on the assumption that a driver's power and a force of the electric booster for a vehicle 1 by the motor 80 are combined to realize the function of an electric brake which generates a hydraulic pressure for stopping a vehicle. In the following description of the present disclosure, for the sake of convenience in explanation, detailed descriptions for structures, shapes and functions of components which are not directly related with the subject matters of the present disclosure, such as a pedal rod 91, a reaction disk 92, a bearing member (drawing symbol not marked) and other components of an electric booster for a vehicle, will be omitted.

As such, the components of the electric booster for a vehicle which are not disclosed in the description of the present disclosure are not limited to specific structures and shapes, and may be applied together with the present disclosure as various embodiments including well-known techniques in the technical field of the present disclosure. In addition, in the following description of the present disclosure, for the sake of convenience in explanation, based on the extending direction of the screw bolt 20, a direction that is the same as or parallel to the extending direction of the screw bolt 20 is defined as an axial direction, a direction that is perpendicular to the extending direction of the screw bolt 20 is defined as a radial direction, and a direction that extends along the circumference of the screw bolt 20 is defined as a circumferential direction.

Figure 3:
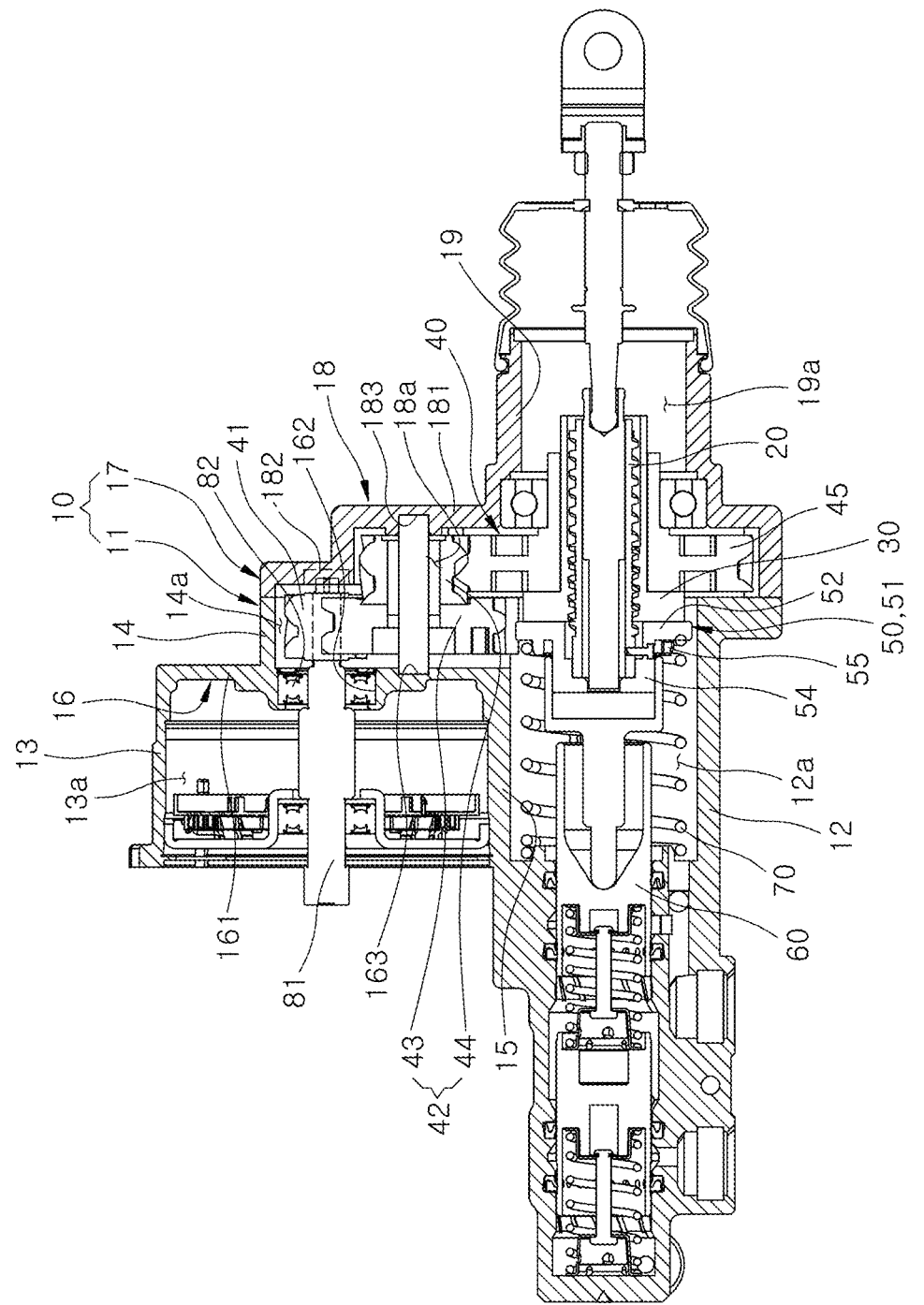
FIG. 3 is a cross-sectional view taken along the line B-B' of FIG. 1.
Figure 4:
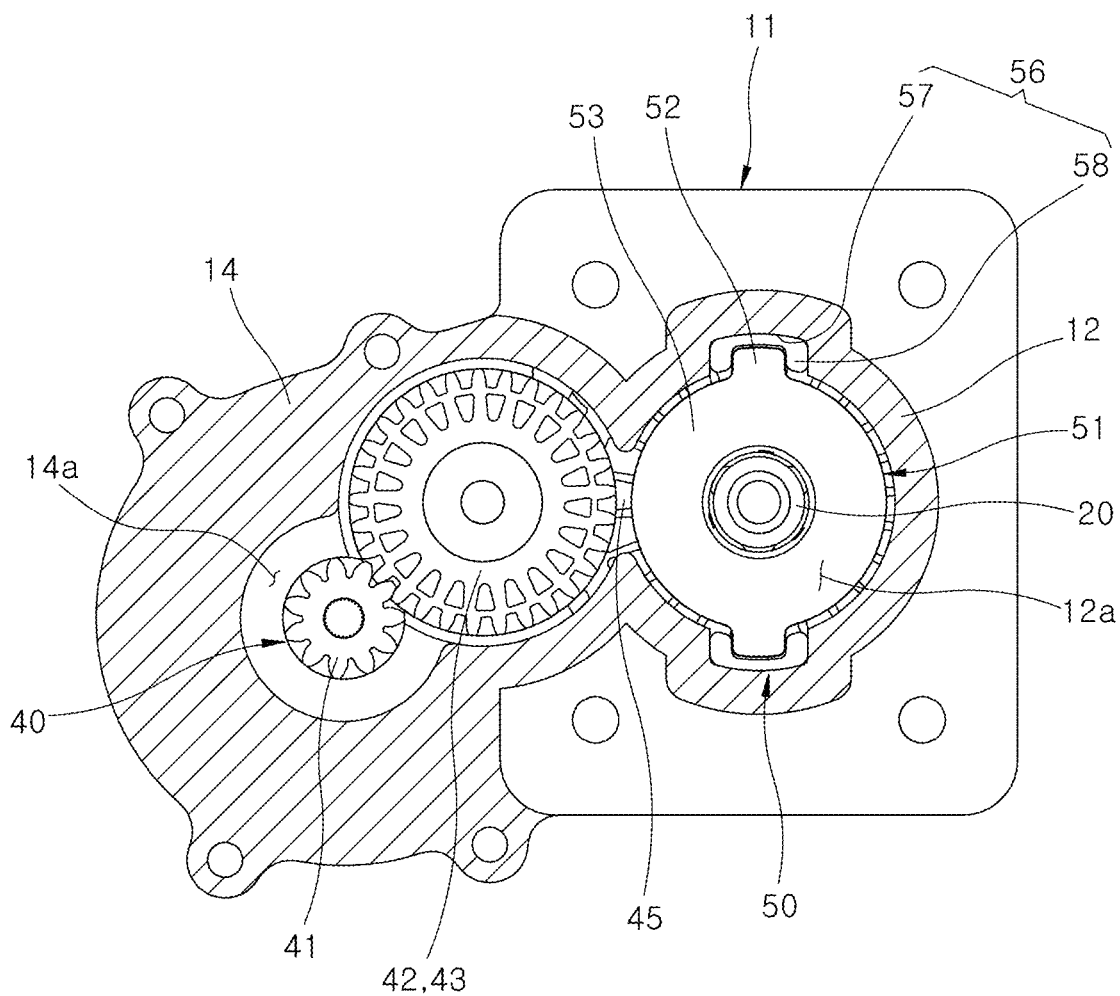
FIG. 4 is a cross-sectional view taken along the line C-C' of FIG. 1.

FIG. 3 is a cross-sectional view taken along the line B-B' of FIG. 1, and FIG. 4 is a cross-sectional view taken along the line C-C' of FIG. 1.

Referring to FIGS. 2 to 4, the rotation preventing unit 50 in accordance with the embodiment of the present disclosure includes a rotation preventing disk part 51 and disk guide parts 56.

The rotation preventing disk part 51 is coupled and fixed to the screw bolt 20, and is moved by the same displacement together with the screw bolt 20. The disk guide parts 56 are coupled and fixed to the housing 10, and guide the movement of the rotation preventing disk part 51 along a straight path. The rotation of the rotation preventing disk part 51 about the screw bolt 20 is prevented by the disk guide parts 56, and the rotation preventing disk part 51 is slidingly moved only along the straight path in the extending direction of the disk guide parts 56.

Figure 5:
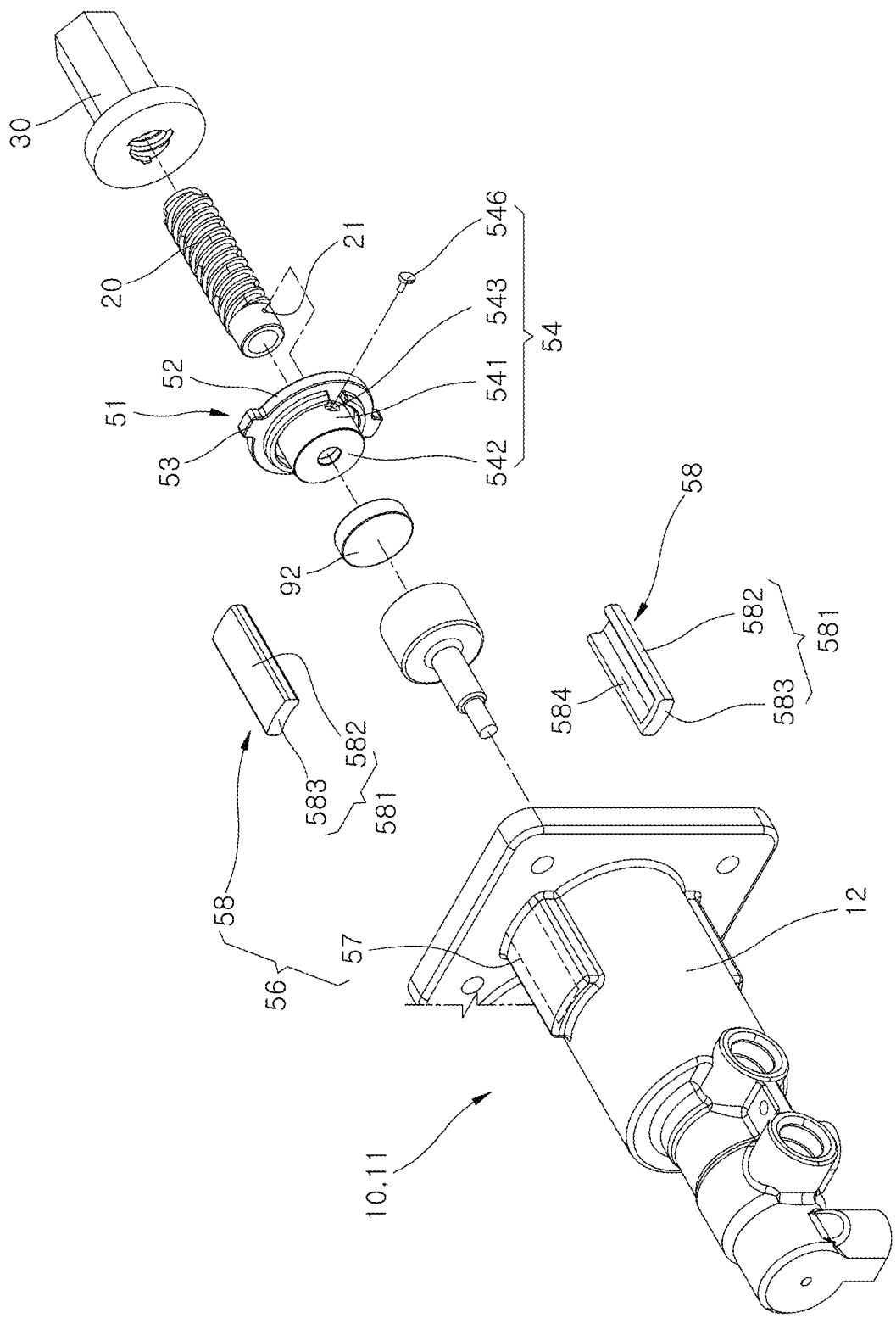
FIG. 5 is an exploded perspective view schematically illustrating a representation of an example of a main part of the electric booster for a vehicle in accordance with the embodiment of the present disclosure.
Figure 6:
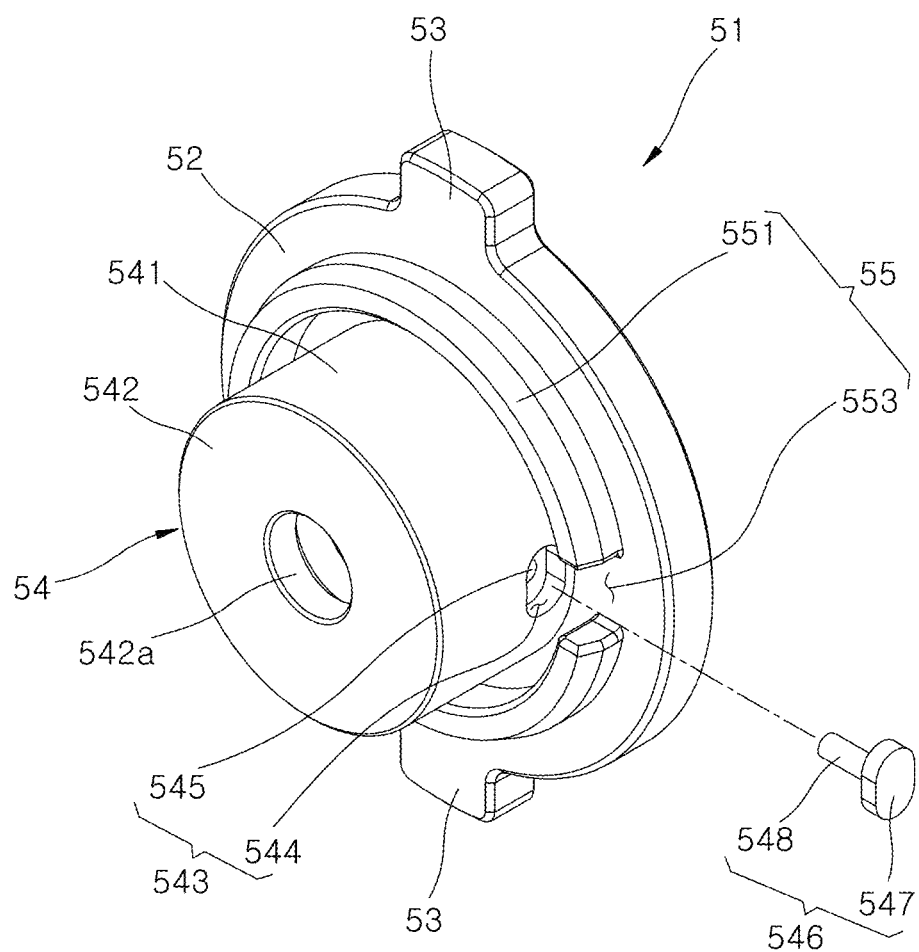
FIG. 6 is a perspective view schematically illustrating a representation of an example of a rotation preventing disk part of the electric booster for a vehicle in accordance with the embodiment of the present disclosure.

FIG. 5 is an exploded perspective view schematically illustrating a representation of an example of a main part of the electric booster for a vehicle in accordance with the embodiment of the present disclosure, and FIG. 6 is a perspective view schematically illustrating a representation of an example of the rotation preventing disk part of the electric booster for a vehicle in accordance with the embodiment of the present disclosure.

Referring to FIGS. 2, 5 and 6, the rotation preventing disk part 51 in accordance with the embodiment of the present disclosure includes a disk portion 52, guide engagement portions 53, a bolt coupling portion 54, and a spring assembly portion 55.

The disk portion 52 has a circular shape corresponding to an inner space of the housing 10, and is disposed around the screw bolt 20. The guide engagement portions 53 are formed on a circumferential outer surface of the disk portion 52 to project in the radial direction, and are inserted and engaged into the disk guide parts 56. A plurality of guide engagement portions 53 are disposed with predetermined intervals.

Due to this fact, a rotational force transferred from the screw bolt 20 to the disk portion 52 may be distributedly transferred to the plurality of disk guide parts 56, and the rotation of the disk portion 52 may be more stably prevented by the disk guide parts 56. While the present embodiment of the disclosure illustrates a structure in which two guide engagement portions 53 are disposed on the circumferential outer surface of the disk portion 52 to be opposite to each other, it is to be noted that at least three guide engagement portions may be disposed with predetermined intervals.

The bolt coupling portion 54 assembles the disk portion 52 to an end of the screw bolt 20, and thereby, couples and fixes the disk portion 52 and the screw bolt 20 to be moved with the same displacement. Referring to FIGS. 5 and 6, the bolt coupling portion 54 in accordance with the embodiment of the present disclosure includes an extending portion 541, an assembly projection portion 542, an assembly hole portion 543, and a locking member 546.

The extending portion 541 has a cylindrical shape which extends in a direction parallel to the screw bolt 20, and is connected with the disk portion 52. The inner diameter portion of the extending portion 541 has a diameter corresponding to the outer diameter portion of the screw bolt 20. The assembly projection portion 542 is formed to project radially inward at an end of the extending portion 541.

When viewed in its entirety, the assembly projection portion 542 has a disk shape which has an inner diameter portion 542a. The inner diameter portion 542a of the assembly projection portion 542 has a diameter smaller than the outer diameter portion of the screw bolt 20 to be brought into contact with the end of the screw bolt 20 in the axial direction. The inner diameter portion of the assembly projection portion 542 has the diameter through which the pedal rod 91 may pass, that is, the diameter that does not interfere with the movement of the pedal rod 91.

The assembly hole portion 543 is formed to pass through the extending portion 541 in the radial direction. The locking member 546 is locked to the screw bolt 20 by passing through the assembly hole portion 543. A locking groove portion 21 into which the end of the locking member 546 may be inserted and locked may be formed in the end of the screw bolt 20.

A bolt member or the like may be applied as the locking member 546, and the locking groove portion 21 may have a structure of a female thread. The locking member 546 has a structure which includes a head portion 547 and a body portion 548. The head portion 547 has an extended width compared to the body portion 548, and the body portion 548 is inserted into the locking groove portion 21 by passing through the assembly hole portion 543. Referring to FIGS. 5 and 6, the assembly hole portion 543 in accordance with the embodiment of the present disclosure includes an engagement receiving portion 544 and a through-hole portion 545.

The engagement receiving portion 544 is formed to be recessed, in a shape corresponding to the head portion 547, from an outer surface of the extending portion 541. The through-hole portion 545 is formed on an inner surface of the extending portion 541 to extend in the radial direction, and communicates with the engagement receiving portion 544. In a state in which the locking member 546 is coupled to the assembly hole portion 543, the head portion 547 of the locking member 546 is received in the engagement receiving portion 544, and the body portion 548 of the locking member 546 is inserted and locked into the locking groove portion 21 by passing through the through-hole portion 545. The rotation preventing disk part 51 is coupled and fixed to the screw bolt 20 by the assembly structure described above.

The spring 70 for preventing the fluctuation of the rotation preventing disk part 51 is interposed between the housing 10 and the disk portion 52. The spring 70 has a structure of a coil spring, and is installed around the piston 60 to be elastically deformable in the axial direction. The spring assembly portion 55 as a device portion for preventing the fluctuation and distortion of the spring 70 is formed on the disk portion 52 to project toward the piston 60. Referring to FIG. 6, the spring assembly portion 55 in accordance with the embodiment of the present disclosure includes a spring assembly projection portion 551 and an opening 553.

The spring assembly projection portion 551 as a device portion for forming an engagement projection preventing the fluctuation of an end of the spring 70 is formed on the disk portion 52 to project toward the spring 70 and the piston 60. The spring assembly projection portion 551 extends concentrically with the screw bolt 20 while having a circular shape.

The end of the spring 70 which has the structure of a coil spring is fitted around the outer diameter portion of the spring assembly projection portion 551 or is fitted between the spring assembly projection portion 551 and the extending portion 541 to be constrained in place on the disk portion 52, and may apply an elastic pressing force evenly over the disk portion 52 having a circular shape.

The opening 553 is formed to be open at a position of the spring assembly projection portion 551 corresponding to the assembly hole portion 543 so as to allow the spring assembly projection portion 551 not to interfere with the assembly of the locking member 546. The locking member 546 may be inserted and locked into the assembly hole portion 543 positioned inside the spring assembly projection portion 551, by passing through the opening 553.

Referring to FIGS. 2, 4 and 5, each disk guide part 56 in accordance with the embodiment of the present disclosure includes a guide installation portion 57 and a guide rail portion 58.

The guide installation portion 57 is formed to be recessed in the radial direction, at a position on an inner surface of the housing 10 corresponding to the guide engagement portion 53. The guide installation portion 57 is formed to extend along a movement path of the screw bolt 20. The guide rail portion 58 as a device portion guiding the rotation preventing disk part 51 along a straight path is coupled to the guide installation portion 57. Referring to FIG. 5, the guide rail portion 58 in accordance with the embodiment of the present disclosure includes a rail body portion 581 and a guide groove 584.

The rail body portion 581 as a device portion forming a basic frame of the guide rail portion 58 is inserted into the guide installation portion 57 which has a recessed shape, and thereby, is coupled to an inner surface of the guide installation portion 57. Referring to FIG. 5, the rail body portion 581 in accordance with the embodiment of the present disclosure includes a first rail body portion 582 and a second rail body portion 583.

The first rail body portion 582 as a device portion which is brought into contact with the inner surface of the guide installation portion 57 in the radial direction is formed to extend in the axial direction of the screw bolt 20, and has a U-shaped cross-sectional shape whose one end facing the rotation preventing disk part 51 is open. The second rail body portion 583 is formed to extend radially inward, at an end of the first rail body portion 582 facing the guide installation portion 57 in the axial direction.

The guide installation portion 57 has an arc-shaped cross-sectional shape corresponding to the inner surface of the housing 10 having a circular cross-sectional shape, with respect to the radial direction perpendicular to the axial direction of the screw bolt 20, and an outer surface of the first rail body portion 582 also has an arc-shaped cross-sectional shape corresponding thereto. An outer surface of the second rail body portion 583 has a shape which extends in the radial direction, and is brought into surface contact with an inner surface of the guide installation portion 57 in the axial direction.

The rail body portion 581 may be stably coupled and fixed in a state in which the rail body portion 581 is brought into surface contact with the guide installation portion 57 in various directions including the radial direction and the axial direction, as described above. The guide groove 584 is formed between the first rail body portion 582 and the second rail body portion 583, and the guide engagement portion 53 which is moved along the guide groove 584 is prevented from directly coming into contact or colliding with the guide installation portion 57 integrally formed with the housing 10, by being brought into contact with the second rail body portion 583.

The guide groove 584 is formed to be recessed, on the rail body portion 581, and is formed to extend along the movement path of the screw bolt 20. In a state in which the guide engagement portion 53 is inserted into the guide groove 584, the guide engagement portion 53 is engaged with the first rail body portion 582 having the U-shaped cross-sectional shape to be prevented from being rotated in the circumferential direction, and is moved only in the extending direction of the guide groove 584 formed to extend along the first rail body portion 582, that is, only in the axial direction of the screw bolt 20.

A hydraulic pressure is formed inside the housing 10 by the movement of the piston 60, and loads generated in the axial direction and the radial direction due to such a hydraulic pressure are directly transferred to the housing 10, without the medium of separate components, to be mainly supported by the housing 10. Also, the housing 10 directly supports other axial and circumferential loads including the elastic force of the spring 70, a rotational force acting on the rotation preventing unit 50, and so forth.

The housing 10 is fabricated to have a stiffness, that is, a thickness and a material, capable of directly supporting such axial, radial, and circumferential loads. Also, the housing 10 has a compact structure including only a first housing unit 11 and a second housing unit 17. That is to say, the number of divisions is minimized to two, that is, the number of division parts and coupling parts for coupling the division parts, which may degrade stiffness, is minimized. As a consequence, it is possible to more stably support the loads acting in the axial direction and the radial direction as described above.

Moreover, since the rotation of the screw bolt 20 may be stably prevented using the rotation preventing unit 50, a rotational force transferred from the screw nut 30 to the screw bolt 20 may be clearly converted into a linear movement of the screw bolt 20. Further, only by additionally forming a small space corresponding to a movement range of the guide engagement portion 53 in addition to forming a space capable of receiving the screw bolt 20, the screw nut 30 and the piston 60 inside the housing 10, the above-described function may be realized.

In the related art, by coupling a plurality of housings 10 to one another and at the same time guiding the movement of the screw bolt 20 along a straight path through using guide pins (not illustrated), the guide pins mainly support loads generated by a hydraulic pressure, and hollow spaces (not illustrated) need to be formed around the guide pins in a number corresponding to the number of the guide pins to guide the reciprocating movement of the screw bolt 20.

According to the present disclosure, when compared to such a related art, a size may be reduced by a size corresponding to the guide pins and the hollow spaces formed around the guide pins. As a consequence, the miniaturization and a light weight of an electric booster 1 may be realized, advantages may be provided in terms of layout in disposing other parts of a vehicle, and a problem caused by ringing of gear noise due to the presence of the hollow spaces may be solved.

Figure 7:
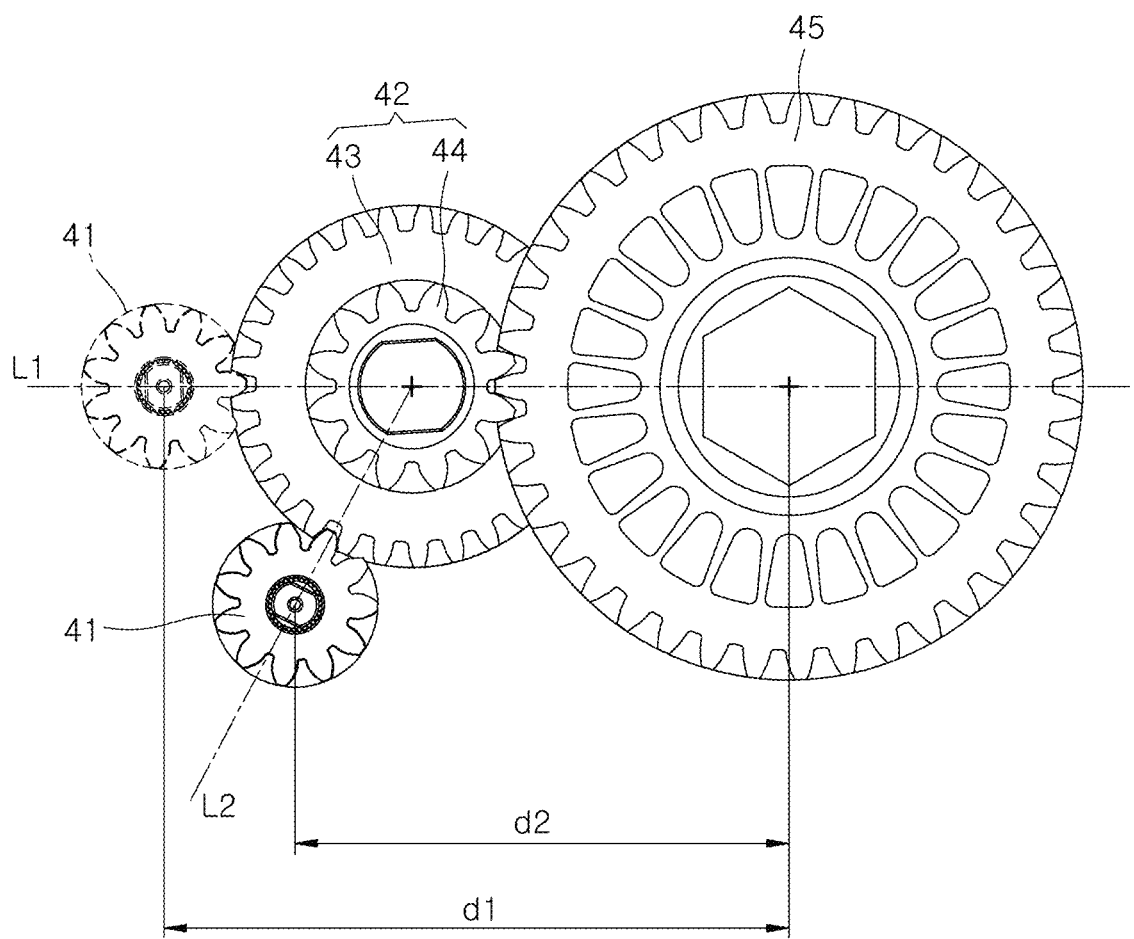
FIG. 7 is a representation of an example of a conceptual diagram to assist in the explanation of the disposition of a gear unit of the electric booster for a vehicle in accordance with the embodiment of the present disclosure.

FIG. 7 is a representation of an example of a conceptual diagram to assist in the explanation of the disposition of the gear unit of the electric booster for a vehicle in accordance with the embodiment of the present disclosure.

Referring to FIGS. 3 and 7, the gear unit 40 in accordance with the embodiment of the present disclosure includes a first gear 41, a second gear 42, and a third gear 45.

The first gear 41 is coupled to an output shaft 81 of the motor 80. The second gear 42 meshes with the first gear 41. Referring to FIGS. 3 and 7, the second gear 42 in accordance with the embodiment of the present disclosure includes a second input gear 43 and a second output gear 44. The second input gear 43 has a larger diameter than the first gear 41, and meshes with the first gear 41. The second output gear 44 has a smaller diameter than the second input gear 43, is coaxially connected with the second input gear 43, and is rotated with the same angular displacement as the second input gear 43.

The third gear 45 has a larger diameter than the second output gear 44, is coupled and fixed to an outer surface of the screw nut 30, and meshes with the second output gear 44. The rotation of the first gear 41 is primarily decelerated while being transferred to the second input gear 43, and the rotation of the second output gear 44 is secondarily decelerated while being transferred to the third gear 45. Namely, a rotational force of the first gear 41 is primarily increased while being transferred to the second input gear 43, is secondarily increased while being transferred from the second output gear 44 to the third gear 45, and is then transferred to the screw nut 30.

Referring to FIGS. 1 and 3, the housing 10 in accordance with the embodiment of the present disclosure includes the first housing unit 11 and the second housing unit 17.

The first housing unit 11 receives the piston 60 and a part of the gear unit 40, more specifically, the piston 60, one ends of the screw bolt 20 pressing the piston 60 and the screw nut 30, the rotation preventing unit 50, the reaction disk 92, the output shaft 81 of the motor 80, the first gear 41, and the second input gear 43.

The second housing unit 17 receives the other parts of the screw nut 30 and the gear unit 40, more specifically, the pedal rod 91, the other ends of the screw bolt 20 and the screw nut 30, the second output gear 44 and the third gear 45. The second housing unit 17 is fabricated separately from the first housing unit 11, and is locked and coupled with the first housing unit 11 by locking means (not illustrated). In a state in which the ends of the first housing unit 11 and the second housing unit 17 are brought into contact with each other, one communicating space is formed inside the first housing unit 11 and the second housing unit 17.

Referring to FIGS. 1 and 3, the first housing unit 11 in accordance with the embodiment of the present disclosure includes a cylinder part 12, a motor connecting part 13, a first gear box part 14, a first partitioning wall part 15, and a second partitioning wall part 16.

The cylinder part 12 has a cylinder shape in which the piston 60 disposed therein may be moved along a straight path. Inside the cylinder part 12, in addition to the piston 60, the one ends of the screw bolt 20 pressing the piston 60 and the screw nut 30, the rotation preventing unit 50, and the reaction disk 92 are received. In the description of the present disclosure, an inner space of the cylinder part 12 is referred to as a piston receiving part 12*a*.

A hydraulic pressure is formed inside the cylinder part 12 by the movement of the piston 60, and the vehicle is braked using the hydraulic pressure formed inside the cylinder part 12 in this way. The motor connecting part 13 has a cylindrical shape which may receive the output shaft 81 of the motor 80, and is formed such that a portion of the motor connecting part 13 to be coupled with the motor 80 is open. In the description of the present disclosure, an inner space of the motor connecting part 13 is referred to as a motor receiving part 13*a*.

The first gear box part 14 is formed between the cylinder part 12 and the motor connecting part 13 to communicate with the cylinder part 12 and the motor connecting part 13. The first gear 41 which is connected with the output shaft 81 and the second input gear 43 are received in the first gear box part 14. In the description of the present disclosure, an inner space of the first gear box part 14 is referred to as a first gear receiving part 14*a*.

The first partitioning wall part 15 as a device part forming a partitioning wall which partitions the cylinder part 12 and the motor connecting part 13 is disposed between the cylinder part 12 and the motor connecting part 13. One side of the first partitioning wall part 15 faces the piston receiving part 12*a*, and the other side of the first partitioning wall part 15 faces the motor receiving part 13*a*.

The second partitioning wall part 16 as a device part forming a partitioning wall which partitions the motor connecting part 13 and the first gear box part 14 is disposed between the motor connecting part 13 and the first gear box part 14. One side of the second partitioning wall part 16 faces the motor receiving part 13*a*, and the other side of the second partitioning wall part 16 faces the first gear receiving part 14*a*. Referring to FIG. 3, the second partitioning wall part 16 in accordance with the embodiment of the present disclosure includes a partitioning wall body portion 161, a bearing installation portion 162, and a first gear shaft support portion 163.

The partitioning wall body portion 161 forms a partitioning wall which partitions the motor connecting part 13 and the first gear box part 14. The bearing installation portion 162 is formed on the partitioning wall body portion 161 to pass through the partitioning wall body portion 161, and a bearing 82 which rotatably supports the output shaft 81 is installed in the bearing installation portion 162. The first gear shaft support portion 163 is formed to be recessed, on the partitioning wall body portion 161, and rotatably supports a rotation shaft (drawing symbol not marked) of the second gear 42.

Referring to FIG. 3, the second housing unit 17 in accordance with the embodiment of the present disclosure includes a second gear box part 18 and a boosting body part 19.

The second output gear 44 is received inside the second gear box part 18. In the description of the present disclosure, an inner space of the second gear box part 18 is referred to as a second gear receiving part 18*a*. The second gear box part 18 adjoins the first gear box portion 14, and the second gear receiving part 18*a* communicates with the first gear receiving part 14*a*. Referring to FIG. 3, the second gear box part 18 in accordance with the embodiment of the present disclosure includes a box body portion 181, a second gear shaft support portion 182, and a third gear shaft support portion 183.

The box body portion 181 has a shape which may receive the second output gear 44. The second gear shaft support portion 182 is formed to be recessed, on the box body portion 181, and rotatably supports the first gear 141, that is, an end of the output shaft 81 to which the first gear 41 is coupled. The output shaft 81 passes through the bearing installation portion 162, and the end of the output shaft 81 is inserted into the second gear shaft support portion 182.

The third gear shaft support portion 183 is formed to be recessed, on the box body portion 181, and rotatably supports the second gear 42. The third gear shaft support portion 183 is formed to face the first gear shaft support portion 163. Both ends of the rotation shaft (drawing symbol not marked) of the second gear 42 are supported by the first gear shaft support portion 163 and the third gear shaft support portion 183, respectively, and in this state, are rotated in place by a rotational force transferred to the second gear 42.

The boosting body part 19 is formed integrally with the second gear box part 18, and adjoins the cylinder part 12. Inside the boosting body part 19, there are received the pedal rod 91, the other ends of the screw bolt 20 and the screw nut 30, and the third gear 45. In the description of the present disclosure, an inner space of the boosting body part 19 is referred to as a bolt nut receiving part 19*a*. In a state in which the boosting body part 19 and the cylinder part 12 are brought into contact with each other, the bolt nut receiving part 19*a* forms one communicating cylindrical space together with the piston receiving part 12*a*. The screw bolt 20 is reciprocatingly moved toward the piston receiving part 12*a* or the bolt nut receiving part 19*a* in liaison with the rotation of the screw nut 30.

In the related art, the output shaft 81 of the motor 80 is received in a housing 10 which is commonly referred to as a 'motor housing' (not illustrated), the second input gear 43 is received in a separate housing 10 which is commonly referred to as a 'boosting body' (not illustrated), and the motor housing and the boosting body are coupled to each other using separate coupling means. The boosting body has a structure in which a first boosting body (not illustrated) receiving the piston 60 and a second boosting body (not illustrated) receiving the pedal rod 91 are coupled to each other.

In the related art, since the output shaft 81 of the motor 80 has a cantilever structure, it is vulnerable to sagging or vibration. Therefore, in general, the motor housing and the boosting body have a structure in which they are bolted at a plurality of places corresponding to four places. Accordingly, when mutually coupling the motor housing and the boosting body, the number of precision machining processes and the number of parts for assembly and sealing increase. More specifically, the number of precision machining processes and the number of parts increase in correspondence to precision machining of four holes (not illustrated), four tabs (not illustrated), O-rings (not illustrated) and O-ring seats (not illustrated).

Also, in the related art, the output shaft 81 is disposed in place where meshing with the gear unit 40 is implemented, through cumbersome and involved processes of matching the center of the output shaft 81 with the second boosting body by coupling the O-rings installed on an outer surface of the motor housing to the first boosting body and of locking means (not illustrated) each having a male screw structure to the tabs of the motor housing through holes of the boosting body.

Further, in the related art, the concentricity of the motor housing and the boosting body may be degraded not only by a clearance that occurs at a connection between the motor housing and the boosting body, such as O-ring coupling parts (not illustrated), during such an assembly process, but also by assembly tolerances of the locking means.

Moreover, in the related art, in order to form the plurality of tabs around the output shaft 81 of the motor 80, a size of the motor housing needs to be larger than a size capable of receiving the output shaft 81, and a size of the boosting body also needs to be increased to form the plurality of holes. As a consequence, an overall size and weight of a device increase, and a lot of a material is consumed in the manufacture of the housing 10.

In addition, in the related art, the motor housing and the boosting body cannot help but not only have respective thicknesses, but also be assembled with each other with clearances in consideration of manufacturing and assembly tolerances, allowances, and the likes. Accordingly, it was impossible to reduce a distance between the first gear 41 coupled to the motor housing and the third gear 45 disposed in the boosting body to be shorter than an interval corresponding to d1 illustrated in FIG. 7.

According to the present disclosure having the above-mentioned configuration, as the first housing unit 11 has a structure in which the motor housing and the boosting body of the related art are integrated, that is, a structure in which the cylinder part 12, the motor connecting part 13, the first gear box part 14, the first partitioning wall part 15 and the second partitioning wall part 16 are integrally formed, the housing 10 has a compact structure including only the first housing unit 11 and the second housing unit 17, that is, a structure in which the number of divisions is minimized to two.

Therefore, according to the present disclosure, the cantilever structure of the output shaft 81 is improved, and the O-rings and the four locking means each having a male screw structure which are applied in the related art may be omitted. Besides, since the precision machining processes for forming the four locking holes, the four tabs and the O-ring seats may be eliminated, it is possible to realize cost reduction due to a reduction in the number of parts and it is possible to further improve the productivity.

Also, according to the present disclosure, the first housing unit 11 has the structure in which the cylinder part 12, the motor connecting part 13, the first gear box part 14, the first partitioning wall part 15 and the second partitioning wall part 16 are integrally formed. As a consequence, it is possible not only to prevent precision and productivity from deteriorating due to machining tolerances, assembly tolerances and allowances of the motor housing and the boosting body, but also to form, in one body, two shaft support elements which support the rotation shafts (drawing symbol not marked) of the first gear 41 and the second gear 42. In other words, since the bearing installation portion 162 and the first gear shaft support portion 163 may be machined on the second partitioning wall part 16, position allowances of the first gear 41 and the second gear 42 may be significantly reduced, and noise due to the vibration of gear meshing portions may be reduced.

Further, according to the present disclosure, the cylinder part 12 and the motor connecting part 13 share the first partitioning wall part 15, and the motor connecting part 13 and the first gear box part 14 share the second partitioning wall part 16. As a consequence, when compared to the related art in which connection surface portions are defined in the motor housing and the boosting body, respectively, and the motor housing and the boosting body are coupled with each other with the connection surface portions disposed to overlap with each other, a size and a weight of the housing 10 may be significantly reduced. Accordingly, since a size of the housing 10 is further reduced, the layout is easy and is applicable to various kinds of vehicles.

Moreover, according to the present disclosure, the cylinder part 12 and the motor connecting part 13 share the first partitioning wall part 15. As a consequence, when compared to the related art, a distance between the first gear 41 and the third gear 45 may be shortened by a thickness of the motor housing and a clearance between the motor housing and the boosting body that are reduced or eliminated, that is, by d2 illustrated in FIG. 7. If necessary, a design range of gears may be further extended, such as by disposing the first gear 41 on a line L1 or disposing the first gear 41 on a line L2.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electric booster for a vehicle, comprising:
a housing having a cylinder structure capable of supporting a hydraulic pressure formed therein;
a screw bolt installed in the housing;
a screw nut screwed to the screw bolt;
a gear unit configured to transfer a rotational force of a motor to the screw nut;
a rotation preventing unit coupled with the screw bolt, and configured to prevent rotation of the screw bolt by being brought into contact with the housing; and
a piston moved by being pressed by the screw bolt, and configured to form a hydraulic pressure in the housing,
wherein the rotation preventing unit comprises:
a rotation preventing disk part coupled to the screw bolt; and
one or more disk guide parts coupled to the housing, and configured to guide movement of the rotation preventing disk part along a straight path, and
wherein the rotation preventing disk part comprises:
a disk portion disposed around the screw bolt;
one or more guide engagement portions formed to project, on a circumferential outer surface of the disk portion, and inserted into the disk guide part; and
a bolt coupling portion connected with the disk portion, and coupled to the screw bolt.

2. The electric booster for a vehicle according to claim 1, wherein the bolt coupling portion comprises:
  an extending portion connected with the disk portion;
  an assembly projection portion formed at an end of the extending portion, and brought into contact with an end of the screw bolt;
  one or more assembly hole portions formed on the extending portion to pass through the extending portion; and
  one or more locking members locked to the screw bolt by passing through the assembly hole portion.

3. The electric booster for a vehicle according to claim 2, wherein the assembly hole portion comprises:
  an engagement receiving portion formed to be recessed, on an outer surface of the extending portion, a head portion of the locking member being received in the engagement receiving portion; and
  a through-hole portion formed to communicate with the engagement receiving portion, a body portion of the locking member passing through the through-hole portion.

4. The electric booster for a vehicle according to claim 1, wherein the rotation preventing disk part further comprises:
  a spring assembly portion formed on the disk portion to project toward the piston, and configured to prevent fluctuation of a spring which is disposed around the piston.

5. The electric booster for a vehicle according to claim 4, wherein the spring assembly portion comprises:
  a spring assembly projection portion formed to project, on the disk portion, extending concentrically with the screw bolt, and an end of the spring being assembled; and
  an opening formed to be open, on the spring assembly projection portion, to allow the locking member of the bolt coupling portion to pass therethrough.

6. An electric booster for a vehicle, comprising:
  a housing having a cylinder structure capable of supporting a hydraulic pressure formed therein;
  a screw bolt installed in the housing;
  a screw nut screwed to the screw bolt;
  a gear unit configured to transfer a rotational force of a motor to the screw nut;
  a rotation preventing unit coupled with the screw bolt, and configured to prevent rotation of the screw bolt by being brought into contact with the housing; and
  a piston moved by being pressed by the screw bolt, and configured to form a hydraulic pressure in the housing,
  wherein the rotation preventing unit comprises:
    a rotation preventing disk part coupled to the screw bolt; and
    one or more disk guide parts coupled to the housing, and configured to guide movement of the rotation preventing disk part along a straight path, and
  wherein the disk guide part comprises:
    a guide installation portion formed to be recessed, on an inner surface of the housing, and extending along a movement path of the screw bolt; and
    a guide rail portion disposed at the recessed guide installation portion, and configured to guide the rotation preventing disk part along the straight path.

7. The electric booster for a vehicle according to claim 6, wherein the guide rail portion comprises:
  a rail body portion brought into contact with an inner surface of the guide installation portion; and
  a guide groove formed to be recessed, on the rail body portion, configured to receive the rotation preventing disk part, and extending along the movement path of the screw bolt.

8. The electric booster for a vehicle according to claim 7, wherein the rail body portion comprises:
  a first rail body portion brought into contact with the inner surface of the guide installation portion in a radial direction; and
  a second rail body portion formed at an end of the first rail body portion, and brought into contact with the inner surface of the guide installation portion in a moving direction of the screw bolt.

9. An electric booster for a vehicle, comprising:
  a housing having a cylinder structure capable of supporting a hydraulic pressure formed therein;
  a screw bolt installed in the housing;
  a screw nut screwed to the screw bolt;
  a gear unit configured to transfer a rotational force of a motor to the screw nut;
  a rotation preventing unit coupled with the screw bolt, and configured to prevent rotation of the screw bolt by being brought into contact with the housing; and
  a piston moved by being pressed by the screw bolt, and configured to form a hydraulic pressure in the housing,
  wherein the housing comprises:
    a first housing unit having the piston and a part of the gear unit disposed therein; and
    a second housing unit connected with the first housing unit, and having the screw nut and the other part of the gear unit disposed therein.

10. The electric booster for a vehicle according to claim 9, wherein the first housing unit comprises:
  a cylinder part formed with a piston receiving part in which the piston is received, and having a hydraulic pressure formed therein by movement of the piston;
  a motor connecting part formed integrally with the cylinder part, and formed with a motor receiving part in which an output shaft of the motor is received; and
  a first gear box part formed between the cylinder part and the motor connecting part to communicate with the cylinder part and the motor connecting part, and formed with a first gear receiving part in which a first gear of the gear unit connected with the output shaft and a portion of a second gear meshed with the first gear are received.

11. The electric booster for a vehicle according to claim 10, wherein the first housing unit further comprises:
  a first partitioning wall part configured to partition the cylinder part and the motor connecting part, and having one side which faces the piston receiving part and the other side which faces the motor receiving part.

12. The electric booster for a vehicle according to claim 10, wherein the first housing unit further comprises:
  a second partitioning wall part configured to partition the motor connecting part and the first gear box part, and having one side which faces the motor receiving part and the other side which faces the first gear receiving part.

13. The electric booster for a vehicle according to claim 12, wherein the second partitioning wall part comprises:
  a partitioning wall body portion configured to partition the motor connecting part and the first gear box part;
  a bearing installation portion formed on the partitioning wall body portion to pass through the partitioning wall body portion, and having installed therein a bearing which rotatably supports the output shaft; and a first gear shaft support portion formed to be recessed, on the partitioning wall body portion, and configured to rotatably support the second gear.

14. The electric booster for a vehicle according to claim 10, wherein the second housing unit comprises:
   a second gear box part formed with a second gear receiving part in which the other portion of the second gear is received, and configured to communicate with the first gear receiving part; and
   a boosting body part formed integrally with the second gear box part, and configured to receive a third gear of the gear unit, which is coupled with the screw nut.

15. The electric booster for a vehicle according to claim 14, wherein the second gear box part comprises:
   a box body portion;
   a second gear shaft support portion formed to be recessed, on the box body portion, and configured to rotatably support the first gear; and
   a third gear shaft support portion formed to be recessed, on the box body portion, and configured to rotatably support the second gear.

16. An electric booster for a vehicle, comprising:
   a housing having a cylinder structure capable of supporting a hydraulic pressure formed therein;
   a screw bolt installed in the housing;
   a screw nut screwed to the screw bolt;
   a gear unit configured to transfer a rotational force of a motor to the screw nut;
   a rotation preventing unit coupled with the screw bolt, and configured to prevent rotation of the screw bolt by being brought into contact with the housing; and
   a piston moved by being pressed by the screw bolt, and configured to form a hydraulic pressure in the housing,
   wherein the gear unit comprises;
      the first gear coupled to an output shaft of the motor;
      the second gear meshed with the first gear, and configured to primarily decelerate rotation of the first gear; and
      the third gear coupled with the screw nut, meshed with the second gear, and configured to secondarily decelerate rotation of the second gear.

17. The electric booster for a vehicle according to claim 16, wherein the second gear comprises:
   a second input gear meshed with the first gear; and
   a second output gear having a smaller diameter than the second input gear, coaxially connected with the second input gear, and meshed with the third gear.

* * * * *